United States Patent Office 3,167,594
Patented Jan. 26, 1965

3,167,594
PROCESS FOR THE PRODUCTION OF
CYCLOPROPANE HYDROCARBONS
Roland Köster and Paul Binger, Mulheim (Ruhr), Germany, assignors to Studiengesellschaft Kohle m.b.H., a German corporation
No Drawing. Filed Apr. 5, 1961, Ser. No. 100,819
Claims priority, application Germany Apr. 11, 1960
23 Claims. (Cl. 260—666)

This invention relates to a process for the production of cyclopropane hydrocarbons.

Several processes have been proposed for the production of cyclopropane hydrocarbons (cf. Angew. Chem., Vol. 72 (1960), page 4). However, these processes almost without exception proceed with poor yields, i.e. with considerable losses of material. For this reason, many of the prior art processes are not suited for the production of three-membered ring compounds on a commercial scale. Therefore, despite their particularly outstanding properties, cyclopropane hydrocarbons have found practical use only in a few cases up to the present. For example, cyclopropane itself is an excellent anaesthetic which is only seldom used due to its high price.

The process of the invention permits the production of cyclopropane hydrocarbons in a simple and cheap manner. It has been found that 3-halogenated boron alkyl compounds can be smoothly converted into cyclopropane hydrocarbons by means of alkali or alkaline earth hydrides or alkali or alkaline earth alkyls. In addition to the respective alkali or alkaline earth halide, boron hydride compounds or boron hydrocarbons are formed as by-products in this process, e.g.

$B(CH_2CH_2CH_2X)_3 + MH \rightarrow 3\Delta + 3\ MX + \frac{1}{2}\ B_2H_6$
$B(CH_2CH_2CH_2X)_3 + MR \rightarrow 3\Delta + 3\ MX + BR_3$ (The H atoms in the 3-halogenated hydrocarbon radical may also be unsubstituted or substituted hydrocarbon radicals.)

The process of the invention is also applicable if only one or two groups on the boron atom consist of 3-halogenated hydrocarbon radicals. Thus, for example, dialkyl and diaryl boron-(3-halogen alkyls) as well as compounds of the general formula $RB(CH_2CH_2CH_2X)_2$ or mixtures of such compounds may also be used in addition to the boron tri-(3-halogen alkyls). Moreover, the reaction in accordance with the invention is also successfully achieved with cyclic boron compounds of the type

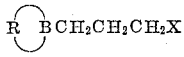

or, for example

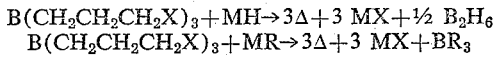

Accordingly, of decisive importance is only the presence of the functional group $b$-$CR_2CR_2CR_2X$ where $b$ is $\frac{1}{3}$ B (boron), R is hydrogen or a hydrocarbon radical, and X is a halogen atom such as chlorine, bromine or iodine. The remaining substituents on the carbon atoms are preferably hydrocarbon radicals which may be directly interconnected to form cyclic radicals, e.g.

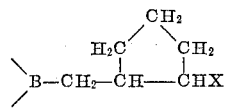

Sodium hydride which is now produced on a commercial scale has been found to be a particularly suitable metal hydride for the purposes of the invention. In addition, lithium hydride, potassium hydride or calcium hydride or barium hydride can be used satisfactorily. Suitable metal hydrocarbons in addition to lithium and sodium alkyls chiefly include magnesium-organic compounds. Both the metal hydrides and the metal hydrocarbons are advantageously reacted in the presence of specific complexing agents or converted already before the reaction into the corresponding complex compounds of the general formula $MH.MeY_3$ or $MR.MeY_3$ (wherein Me is an element of main group III, especially boron, aluminum and Y is hydrogen, a hydrocarbon radical or an alkoxy or aryloxy radical) and reacted as such in accordance with the invention. Particularly suitable $MeY_3$ compounds include the boron trialkyls $BR_3$, alkyl boric acid esters $R_nB(OR)_{3-n}(n=1\ or\ 2)$ and boric acid esters $B(OR)_3$ or the aluminum counterparts of these boron compounds. Cyclic organic boron compounds of the following composition are also suitable complexing agents for the metal hydrides or the metal hydrocarbons:

In addition, boron compounds of the following types have been found to be suitable complexing agents for the metal hydrides:

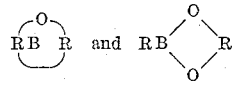

The compounds mentioned above, especially the boron compounds, may be simultaneously used as solvents in carrying out the reaction in accordance with the invention, i.e. they are preferably used in excess thereby making possible a particularly uniform reaction. The yields of cyclopropane hydrocarbons are generally quantitative. Moreover, the three-membered ring compounds are formed in an outstanding purity.

As may be seen from the general formula $MH.MeY_3$, alkali and alkaline earth boron hydrides $MBH_4$ or $M(BH_4)_2$ in addition to the metal hydrides may be used for the production of cyclic hydrocarbons from the 3-halogenated boron compounds. When operating in this case in the presence of, for example, tertiary amines, the N-trisubstituted borazanes are obtained as by-products, e.g.:

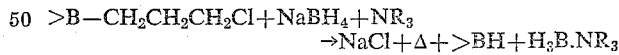

When using compounds of the type $M(MeR_4)$, the reaction of the invention proceeds according to the following equation:

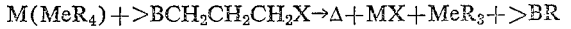

Suitable solvents for the process of the invention include aliphatic saturated hydrocarbons and aromatic hydrocarbons. Ethers are likewise excellently suited as diluents. In this connection, when using the metal boron hydrides, the dimethyl ethers of di- and triethylene glycol besides tetrahydrofurane have been found to be among the particularly suitable ethers.

The preparation of the 3-halogenated boron alkyl compounds to be used in the process of the invention is very simple. These materials may, for example, be produced very conveniently by reacting boron hydride compounds with the readily producible allyl halides. In this connection, the term allyl halide comprises not only compounds of the formula $CH_2=CH-CH_2X$ (wherein X is halogen) but also any compound in which the H atoms of allyl halide are substituted by hydrocarbon radicals (3-halogen alkene-(1) compounds).

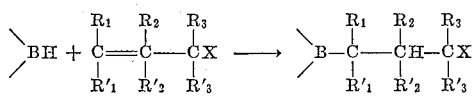

(wherein $R_1$ to $R_3$ and $R'_1$ to $R'_3$ are H or equal or different substituted or unsubstituted hydrocarbon radicals).

Thus, for example, when reacting an alkyl diborane with a 3-halogen alkene-(1), there are obtained alkyl boro-3-halogen alkyls which, in accordance with the invention, are reacted with metal hydrides or their complex compounds to form cyclopropane hydrocarbons and alkyl diboranes. From this, there results a particularly favorable combination of the reaction of the invention with known reactions since the boron hydride compounds initially charged for the production of 3-halogenated boron compounds (e.g. alkyl diboranes) are quantitatively recovered. These may then be reused for the preparation of the starting materials necessary in accordance with the invention. A loss of the expensive boron compounds is not encountered therefore.

The reaction occurring in case of the last-mentioned combination of the process of the invention with known reactions can be expressed by the following empirical equation:

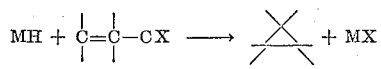

This simple reaction cannot be carried out as such. However, the process of the invention permits the performance of this reaction without an increased consumption of material.

In carrying out the process of the invention, attention should be paid to the following facts: When producing the 3-halogenated boron compounds from alkyl diborane and allyl halides, it is most preferable to select the alkyl radicals of the boron compound such that a sufficiently wide gap exists between the boiling point of the cyclopropane hydrocarbons and that of alkyl diborane so that smooth separation of the three-membered ring compounds is possible (e.g. by distillation). For example, a 3-halogenated boron alkyl produced from ethylated diboranes may readily be used for the production of cyclopropane. However, for the production of methyl butyl cyclopropane, the use of 3-halogenated boron alkyls produced from butyl diborane and the allyl halide necessary for the reaction (e.g. 2-chloro-3-methylene-heptane) is to be preferred. The reaction of the invention must be effected in an atmosphere which is free from air and moisture since the metal-organic compounds used are not stable to air or moisture and this would seriously affect the yields of cyclopropane or its derivatives.

Example 1

12.6 gms.=0.077 moles of sodium tripropyl boron hydride ($Na(BH(C_3H_7)_3)$) are dissolved in 17.5 gms. of absolute hexane and 14.5 gms.=0.077 moles of dipropyl-(3-chloro-2-methylpropyl)-boron (produced from propyldiborane and methallyl chloride) are slowly added to the solution while stirring. The evolution of methyl cyclopropane starts immediately. The gas is collected in a gas holder. After all of the dipropyl-(3-chloro-2-methyl propyl)-boron has been added, the reaction mixture is heated at 50 to 60° C. for 30 minutes to complete the reaction. The precipitated sodium chloride (4.5 gms.) is removed by filtration. After having distilled off the solvents, 16.6 gms. of a mixture of boron tripropyl and tetrapropyl diborane (10.3 gms. boron tripropyl and 6.3 gms. of tetrapropyldiborane) are obtained from the clear filtrate. The methyl cyclopropane (4 gms.=1.6 normal liters=93% of the theory) is directly obtained in a 99.7% purity.

Example 2

A suspension of 1.1 gms. of sodium hydride and 20 ml. of perhydrocumene is heated to 100–120° C. and mixed within 30 minutes with 8.5 gms.=0.045 moles of dipropyl-(3-chloro-2-methyl-propyl)-boron while stirring. Methylcyclopropane in amount of 1.81 gms. (72% of the theory) is formed. The remaining reaction mixture is separated from the precipitated sodium chloride. There is obtained a clear filtrate which consists of a solution of tetrapropyl diborane in perhydrocumene.

Example 3

To a solution of 49.2 gms.=0.3 moles of sodium tripropyl boron hydride ($Na(B(C_3H_7)_3H)$) in 60 gms. of absolute xylene are added at room temperature within 1 hour 66.4 gms.=0.3 moles of dipropyl-(2-chloromethyl-pentyl)-boron (prepared from tetrapropyl diborane and 2-chloromethylpentene-(1)) and the reaction mixture is heated upon completion of the addition for another hour at 50–60° C. Subsequent distillation results in 20.6 gms. of n-propyl-cyclopropane having a boiling point of 68–69° C. and, after having collected an intermediate fraction (xylene), 65 gms. of a mixture of boron tripropyl and tetrapropyl diborane (boiling point at 12 mm. Hg, 56–63° C.). The residue consists of substantially pure sodium chloride.

Example 4

Following the procedure of Example 3, the cleavage of the addition product of 14 gms. (0.1 mole) tetraethyl diborane and 23.7 gms. (0.2 mole) 3-chloro-2-methyl-pentene-(1) with a solution of 24.4 gms. (0.2 mole) of sodium triethyl boron hydride in 100 ml. boron triethyl results in 14.4 gms. 1-methyl-2-ethylcyclopropane (cis- and trans-compounds in a 1:1 molar ratio) having a boiling point of 63–65° C.

Example 5

A solution of 35.2 gms.=0.2 moles of sodium aluminum tetraethyl ($Na(Al)(C_2H_5)_4$) in 200 ml. Diglyme (diethylene glycol dimethyl ether) is heated to 60–80° C. 29 gms.=0.2 mole of diethyl-(3-chloropropyl)-boron are added dropwise while stirring. A total of 7.7 gms. of cyclopropane which is condensed at —80° C. in an intense cooling trap is formed. At the same time, sodium chloride is precipitated. The sodium chloride is separated by filtration and the filtrate is distilled, the resultant distillate comprising 18 gms. of boron triethyl and 21 gms. of aluminum triethyl in addition to the solvent.

Example 6

Propyl-(3-chloro-2-methylpropyl)-borane in amount of 18.8 gms. 0.1 mole) prepared from 9.8 gms. (0.05 mole) of tetrapropyl diborane and 9.0 gms. (0.1 mole) of methallyl chloride are slowly dropped with stirring into a solution of 20.6 gms. (0.1 mole) of sodium boron tetrapropyl (melting point, 148° C.) in 80 ml. of absolute xylene heated at 120–130° C. Methyl cyclopropane escapes immediately while sodium chloride is precipitated. The reaction is completed after about 45 minutes. There are obtained 5.4 gms. (96.5% of the theory) of methyl cyclopropane having a purity of 98% (the balance being propene). After removal of the NaCl (5.5 gms.) by filtration, 26.5 gms. (94.6% of theory) of boron tripropyl are obtained from the filtrate (after having distilled off the solvent).

Example 7

Following the procedure of Example 1, the cleavage of 18.7 gms. (0.1 mole) dipropyl(3-chloro-2-methyl-propyl)-boron with 14.8 gms. (0.1 mole) of the complex compound sodium hydride/2-methyl-propyl-borolane of the formula

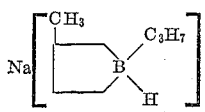

in 30 ml. hexane resulted in 5.4 gms. methyl cyclopropane, 12.5 gms. boron tripropyl (boiling point at 12 mm. Hg, 55° C.) and 7.6 gms. bis(3-methylborolane) (boiling point at 12 mm. Hg, 95° C.) in addition to 5.5 gms. sodium chloride.

*Example 8*

Following the procedure of Example 2 and using 3-chloropropylborolane instead of dipropyl-(3-chloro-2-methylpropyl)-boron under otherwise identical conditions there resulted cyclopropane in a yield of more than 90% in addition to sodium chloride and bis-borolane (boiling point at 12 mm. Hg, 70° C.).

*Example 9*

When using the procedure of Example 1 and allowing 16.4 gms. of sodium-tripropyl boron hydride to act on the reaction product of 12 gms. allyl bromide and 8 gms. tetrapropyl diborane there are obtained 2.9 gms. cyclopropane (69% of the theory in a 97.8% purity) (the impurities comprising 1.8% propane and 0.4% propene).

*Example 10*

A solution of 8.4 gms. ethyl magnesium chloride in 25 ml. of diethyl ether is slowly mixed with 14.6 gms. of diethyl-3-chloropropyl borane while cooling. The evolution of cyclopropane starts immediately, the amount of cyclopropane obtained being 3.6 gms. (85.6% of the theory). After having distilled off the ether, 9.5 gms. boron triethyl (boiling point, 95° C.) are obtained.

What is claimed is:

1. A process for the production of a cyclopropane hydrocarbon, which comprises reacting a boron compound of the formula:

$$R'_{3-n}(BCR_2-CR_2-CR_2X)_n$$

wherein X is selected from the group consisting of chlorine, bromine, and iodine, R is a member selected from the group consisting of hydrogen, alkyl, and cycloalkyl, R' is alkyl, and $n$ is an integer of from 1–3, with a compound selected from the group consisting of alkali metal and alkaline earth metal hydrides, alkali metal and alkaline earth metal alkyls, and complex compounds thereof with compounds of the formula $$MeY_3$$

where Me is a member selected from the group consisting of aluminum and boron and Y is a member selected from the group consisting of hydrogen, hydrocarbon radicals, alkoxy and aryloxy radicals with the exclusion of air and moisture.

2. A process according to claim 1, wherein R is a hydrocarbyl substituted hydrocarbon radical.

3. A process according to claim 1, wherein said compound is a boric acid ester.

4. A process according to claim 1, wherein said compound is a cyclic organo boron compound.

5. A process according to claim 1, wherein said compound is an aluminum trialkyl.

6. A process according to claim 1, wherein said compound is a cyclic organo aluminum compound.

7. A process according to claim 1 wherein said substituents R are hydrocarbon radicals directly joined.

8. A process according to claim 1 wherein said starting boron compound has the general formula $$RB(CH_2CH_2CH_2X)_2$$

9. A process according to claim 1 wherein said starting boron compound is a cyclic boron compound.

10. A process according to claim 1 wherein said reaction is effected using sodium hydride.

11. A process according to claim 1 wherein said compound $MeY_3$ is formed in situ in the reaction.

12. A process according to claim 1 wherein said reaction is effected in the presence of a tertiary amine.

13. A process according to claim 1, wherein said compound $MeY_3$ is boron trialkyl.

14. A process according to claim 13 wherein said compound $MeY_3$ is a boron compound and is employed in excess, the excess serving as solvent in the reaction.

15. A process according to claim 1 wherein said reaction is effected in the presence of a solvent.

16. A process according to claim 15 wherein said solvent is selected from the group consisting of aliphatic saturated hydrocarbons, aromatic hydrocarbons and ether.

17. A process according to claim 16 wherein said ether is dimethyl ether of diethylene glycol.

18. A process according to claim 16, wherein said ether is a dimethyl ether of triethylene glycol.

19. A process according to claim 1 wherein said starting compound is boron tri(3-halogen alkyl).

20. A process according to claim 19, which comprises selecting said boron tri-(3-halogen alkyl) so that the boiling point between the resulting cyclopropane reaction product and the corresponding alkyl diborane is sufficiently different to permit separation of the cyclopropane reaction product from the reaction mixture.

21. A process according to claim 20 wherein said cyclopropane reaction product is recovered from the reaction mixture by distillation.

22. A process according to claim 19 wherein said 3-halogenated boronalkyl compound is obtained by reacting a boron hydride compound with an allyl halide.

23. A process according to claim 22, wherein said allyl halide is substituted by a member selected from the group consisting of hydrocarbon and hydrocarbyl substituted hydrocarbon radicals.

References Cited in the file of this patent

UNITED STATES PATENTS 2,921,963    Baker et al.    Jan. 19, 1960
2,927,133    Bragdon    Mar. 1, 1960

FOREIGN PATENTS 623,817    Canada    July 11, 1961
1,184,344    France    July 20, 1959